United States Patent [19]

Roberts

[11] Patent Number: 4,590,651
[45] Date of Patent: May 27, 1986

[54] SHARPENER FOR PHILLIPSHEAD SCREWDRIVERS

[76] Inventor: Joseph D. Roberts, U.S. Post Office, Aiea Shopping Center, Room 121, Aiea, Hi. 96701

[21] Appl. No.: 757,479

[22] Filed: Jul. 22, 1985

[51] Int. Cl.$^4$ .............................................. B23D 71/08
[52] U.S. Cl. ............................................ 29/80; 76/82
[58] Field of Search ............... 29/76 R, 76 A, 78, 79, 29/80; 76/82–89.2, 101 D

[56] References Cited

U.S. PATENT DOCUMENTS

| 3,575,068 | 4/1971 | Stafford | 29/78 |
| 4,069,619 | 1/1978 | Escamilla | 76/89 |
| 4,348,809 | 9/1982 | Jackson | 76/82.2 |

Primary Examiner—Francis S. Husar
Assistant Examiner—Jerry Kearns

[57] ABSTRACT

The invention will sharpen worn phillipshead screwdrivers. The invention contains four files that fit into the grooves of a phillipshead screwdriver. The worn phillipshead screwdriver is sharpened when the worn phillipshead screwdriver is moved in-and-out of the invention.

4 Claims, 4 Drawing Figures

SECTION B-B

SIDE VIEW (WITH BODY REMOVED)

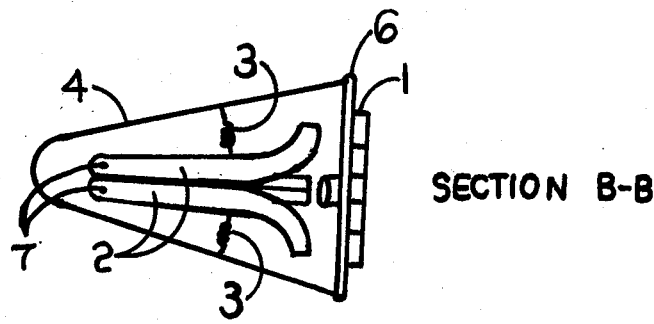
FIG 4: SIDE VIEW (WITH BODY REMOVED)
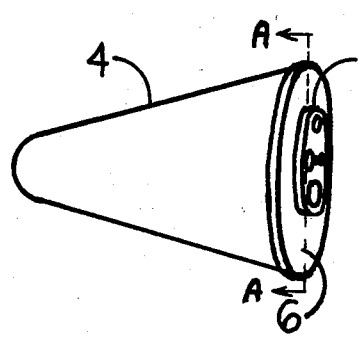
FIG 1: SIDE VIEW
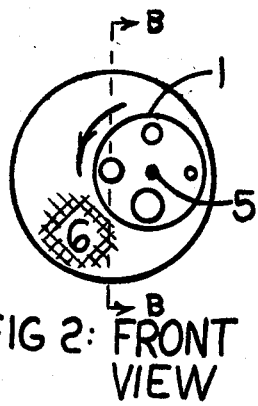
FIG 2: FRONT VIEW
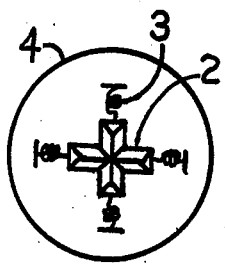
FIG 3: FRONT VIEW (COVER REMOVED) SECTION A-A

SHARPENER FOR PHILLIPSHEAD SCREWDRIVERS

SUMMARY OF INVENTION

The object of the invention is to easily sharpen worn phillipshead screwdrivers. The tip of phillipshead screwdrivers become worn and rounded with age and cannot be used to drive phillipshead screws. A slight file action in the slotted grooves of the driver by the invention, restores the tip of the driver to a usable condition.

DESCRIPTION OF VIEWS OF DRAWINGS

FIG. 1 is the side view of the invention.
FIG. 2 is the front view.
FIG. 3 is the section view A—A showing the cover (2) removed.
FIG. 4 is a section view B—B showing a section of the body (1) removed to show internal parts.

DETAILED DESCRIPTION

Throughout the description, like numerals designate like parts.

The invention allows the driver end of a phillipshead screwdriver to be inserted into the hole in the center of the guide (1) (see FIG. 1 and FIG. 2). The driver passes through the hole in the guide (1) and then makes contact with the four curved triangular files (2). The four triangular files (2) are aligned at ninety degrees (90°) to each other to allow contact with the four grooves of the phillipshead screwdriver. (Ends of all phillipshead screwdrivers have four grooves equally spaced at ninety degrees; these grooves align with the slots in a phillipshead screw.) The triangular files (2) recut the grooves on the tip of a worn driver and return the driver to a useful condition.

The leading edges of the four triangular files (2) are slightly curved (about 20 degrees) away from the center axis of the invention to allow the files to easily accept the driver into the center of the four files where the tip of the driver is filed.

A spring (3) is attached in compression to each of the four files. This force is transferred to the four grooves in the tip of the phillipshead screwdriver and allows the files to recut the grooves in the tip of the driver.

The four springs (3) are perpendicular and could be replaced with one circular spring that encircles the four files near the curved end of the files. This spring would exert a constant and equal inward force on all four files (2) and reduce the number of moving parts of the invention from four short springs to one circular spring.

The body (4) is made of clear durable plastic and allows the user to easily insert the tip of the phillipshead screwdriver into the guide (1) and visually align the four grooves in the driver with the four files (2). The body (4) can be cone shaped as shown in FIG. 4, cylindrical, or most any other basic geometric shape.

The guide (1) has several different sized holes and can be rotated to accept different sizes of screwdrivers. Larger screwdrivers have larger diameter shafts. Four different diameter holes are shown in the illustration of the guide (1). (The rotating action of the guide (1) is similar to the action of a standard wall mount type of pencil sharpener which allows pencils with different diameters to be sharpened.)

The guide (1) rotates either clockwise or counterclockwise on a screw (5). The screw (5) secures the guide (1) to the plastic cap (6) of the invention (see FIG. 2). The cap (6) snaps over the front side of the body (4) and the cap (6) can be removed by pushing on the outer edge of the cap (6) in a direction away from the body (4). Removal of the cap (6) allows inspection of the files (4), springs (3), and removal of metal filings that accumulate from the filing process.

The four triangular files (2) are geometrically arranged so that one of the three edges of each of the triangular files (2) is directed towards the longitudinal axis of the body (4) (See FIG. 3). The edge of the triangular files (2) recut the grooves on a worn phillipshead screwdriver.

The four triangular files (2) are each connected to the inner part of the body (4) by a pivot pin (7) (See FIG. 4). Each file pivots at its pivot pin (7) when a phillipshead screwdriver is inserted in the guide (1) and the phillipshead screwdriver is moved in an in-and-out sharpening motion.

DIRECTION FOR USE

Select a hole in the guide (1) to match the diameter of the screwdriver. Insert the driver into the hole selected. Visually align the four grooves in the tip of the phillipshead screwdriver with the edges of the four files inside "The Phillips Edge." Move the driver in an in-and-out motion until sharpened.

I claim:

1. A sharpener for phillipshead screwdrivers comprising: an elongated hollow body having a central longitudinal axis, four triangular cross section files extending parallel to the longitudinal axis of said body, means pivotally mounting one end of each of said files in said hollow body for radial movement, the other end of each of said files being curved radially outward of said longitudinal axis, spring means biasing the curved ends of said files toward the longitudinal axis, guide means at one end of said body adjacent said curved ends of said files for guiding a phillipshead screwdriver into alignment between said files.

2. The sharpener of claim 1 wherein said hollow body is closed adjacent the pivotally mounted ends of said files and has a removable cap adjacent said curved ends of said files.

3. The sharpener of claim 2 wherein said guide means is a circular plate having plurality of different sized holes spaced equidistant from the central axis of the plate, means pivotally kmounting said plate about said central axis on said removable cap.

4. The sharpener of claim 1 wherein said spring biasing means comprises a radially extending compression spring attached between each of said files and said hollow body.

* * * * *